United States Patent

[11] 3,558,027

| | | |
|---|---|---|
| [72] | Inventor | **Jean Jullien-Davin** **Valence, France** |
| [21] | Appl. No. | **790,244** |
| [22] | Filed | **Jan. 10, 1969** |
| [45] | Patented | **Jan. 26, 1971** |
| [73] | Assignee | **Crouzet** **Paris, France** **a French Company** |
| [32] | Priority | **Jan. 18, 1968** |
| [33] | | **France** |
| [31] | | **136,592** |

[54] STATION-SELECTOR MAGAZINE
7 Claims, 8 Drawing Figs.

[52] U.S. Cl. .......... 226/90, 226/195, 226/188, 226/100; 100/179
[51] Int. Cl. .......... G11b 15/29
[50] Field of Search .......... 226/90, 89, 195, 181, 188, 100, 108; 340/174.1(J, K); 179/100.2Z

[56] References Cited
UNITED STATES PATENTS

| | | | |
|---|---|---|---|
| 3,326,483 | 6/1967 | Ivans | 179/100.2(Z) |
| 3,417,938 | 12/1968 | Markakis et al. | 179/100.2(Z) |
| 3,453,397 | 7/1969 | Miller et al. | 179/100.2(Z) |
| 3,475,563 | 10/1969 | Papst | 179/100.2(Z) |

*Primary Examiner*—Allen N. Knowles
*Attorney*—Holman, Glascock, Downing & Seebold

ABSTRACT: Station-selector magazine which is suitable for use on board aircraft for storing the coordinates of a plurality of characteristic stations marking a flight path for the utilization of said coordinates in the digital computer of a navigation system, said coordinates being indicated on a recording medium which is capable of moving under the action of transfer means in front of visual observation means and photoelectric reading means and which can thus be read visually and photoelectrically, wherein said magazine comprises a casing which is intended to be fixed on a support such as the instrument panel of an aircraft, a removable drawer which is housed within said casing and capable of being locked in the utilization position being provided at the front end with photoelectric reading means and at the bottom with positioning means for receiving a loading unit, said unit being adapted to contain on the one hand the coordinate recording medium and on the other hand means for transferring said recording medium manual-control means mounted within a bottom compartment of said drawer and serving to actuate the means for transferring the coordinate recording medium which is incorporated in said loading unit.

INVENTOR
J. JULLIEN - DAVIN
By Holman, Glascock, Downing & Seebold
ATTORNEYS

INVENTOR
J. JULLIEN-DAVIN
By Holman, Glascock, Downing & Seebold
ATTORNEYS

STATION-SELECTOR MAGAZINE

This invention is directed to a station-selector magazine which is more particularly intended to be fitted on board aircraft for the purpose of storing in a memory device the coordinates of a plurality of points which are characteristic of said "stations" (base, marker beacon, etc.) which mark a flight path for the utilization of said coordinates in the digital computer of a navigation system, said coordinates being indicated on a recording medium which is capable of moving under the action of transfer means in front of visual observation means and photoelectric reading means and which can thus be read directly by the user and scanned photoelectrically so as to provide the data which are intended to be processed by the digital computer.

The devices which are known at the present time and in which storage is carried out on cards in the majority of cases are relatively cumbersome and make it necessary for the user to carry out operations involving substitution of cards when the number of stations to be stored exceeds the card capacity of the magazine, which is frequently the case.

The magazine which forms the subject of this invention and constitutes a fixed and static storage device for the computer provides a high storage capacity in respect of a small overall size by virtue of the fact that the data relating to the stations are recorded on a medium of small volume and large capacity.

The magazine is distinguished by the fact that it comprises a casing which is intended to be fixed on a support (such as the instrument panel of an aircraft) and which contains a removable drawer, said drawer being capable of being locked in the utilization position and provided at the front end with photoelectric reading means and at the bottom with positioning means for receiving a loading unit, said unit being adapted to contain on the one hand the coordinate recording medium and on the other hand means for transferring said recording medium, manual control means placed within a bottom compartment of said drawer and serving to actuate the means for transferring the coordinate recording medium which is incorporated in the loading unit.

In a preferred form of construction, the novel magazine in accordance with the invention can provide the following particular features:

the coordinate recording medium which is contained in the loading unit consists of a flexible tape in the form of a closed loop which is placed within the loading unit so as to form free snaked coils and which is provided with transfer slots along at least one of its two edges and with translucent portions or so-called "reserves" which are intended to receive the station references in clear, provision being made for at least one but preferably two rows of translucent points for the coded inscription of the coordinates of said stations and one separate auxiliary translucent point of for indicating the correct position of the tape with respect to the reading means;

the transfer means incorporated in the loading unit which is provided with two slots for the insertion of the coordinate recording tape and the passage of said tape in front of the reading means consist of two studded wheels disposed on the front face of the loading unit on each side of a front zone thereof from which the reading is taken, said studded wheels being adapted to cooperate with the transfer slots of the tape which is adapted to move past said front zone of the loading unit, each wheel being associated with friction-coupling means for the connection of said wheel to the control means;

the control means comprises a manually-operated rotary element which is accessible from the exterior and adapted to actuate the friction-coupling means of the two studded wheels by means of a drive system having two automatically-selected drive ratios each corresponding to one direction of the operation performed on the control element and consequently to one direction of transfer of the coordinate recording tape, the arrangement of said drive system being such that the particular studded wheel which performs the driving function and exerts a tractive force on that portion of the tape which moves in front of the reading zone has a tendency to rotate at a higher speed than the other studded wheel so as to produce both tension and surface flatness of the aforesaid portion of tape;

the drive system having two drive ratios selected as a function of the direction of operation exerted on the control element comprises a pinion which is actuated from the control element and which is integral with the driving toothed ring of a ratchet-tooth-coupling system whilst the driven tooth ring is integral with one sliding cheek of a variable-diameter pulley whose other cheek is not intended to slide axially and is separated from the first by an elastic ring which tends both to separate the two cheeks in order that said pulley should have a minimum diameter and to cause the two toothed rings of the ratchet-tooth coupling system to engage completely, the variable-diameter pulley aforesaid being coupled with a pulley having a fixed diameter comprised between the maximum and minimum values of the variable-diameter pulley, the two pulleys being connected to the respective friction-coupling systems of the two studded wheels and the directions of the teeth of the ratchet-tooth coupling system being such that the two toothed rings are fully engaged and that the diameter of the corresponding pulley is of minimum value when the studded wheel which is associated therewith is the driving pulley;

the connection between each friction-coupling system and the shaft of the corresponding pulley is obtained by flexible engagement means;

the loading unit is provided with a recess in the zone corresponding to the reading zone whilst the drawer is provided on the one hand with an illuminating unit adapted to engage in said recess which is closed off by the coordinate recording tape and on the other hand with a photoelectric reading unit placed opposite to the illuminating unit and separated therefrom by said tape, the front wall of the drawer being additionally provided with a window for reading indications in clear which are carried by the transparent reserves of the tape.

Further properties of the invention will become apparent from the following description which relates to one example of construction, reference being made to the accompanying drawings which are not intended to imply any limitation and in which.

Figure 8:
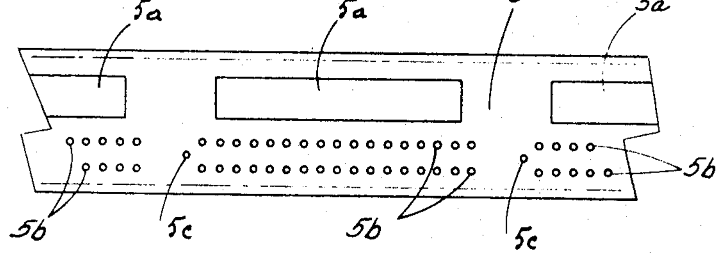

FIGS. 4, 5, 6 and 7 (the first being a partial vertical sectional view) show details of the means for transferring the tape; and FIG. 8 is a front view of a section of the flexible storage tape.

Figures 1, 2, 3:
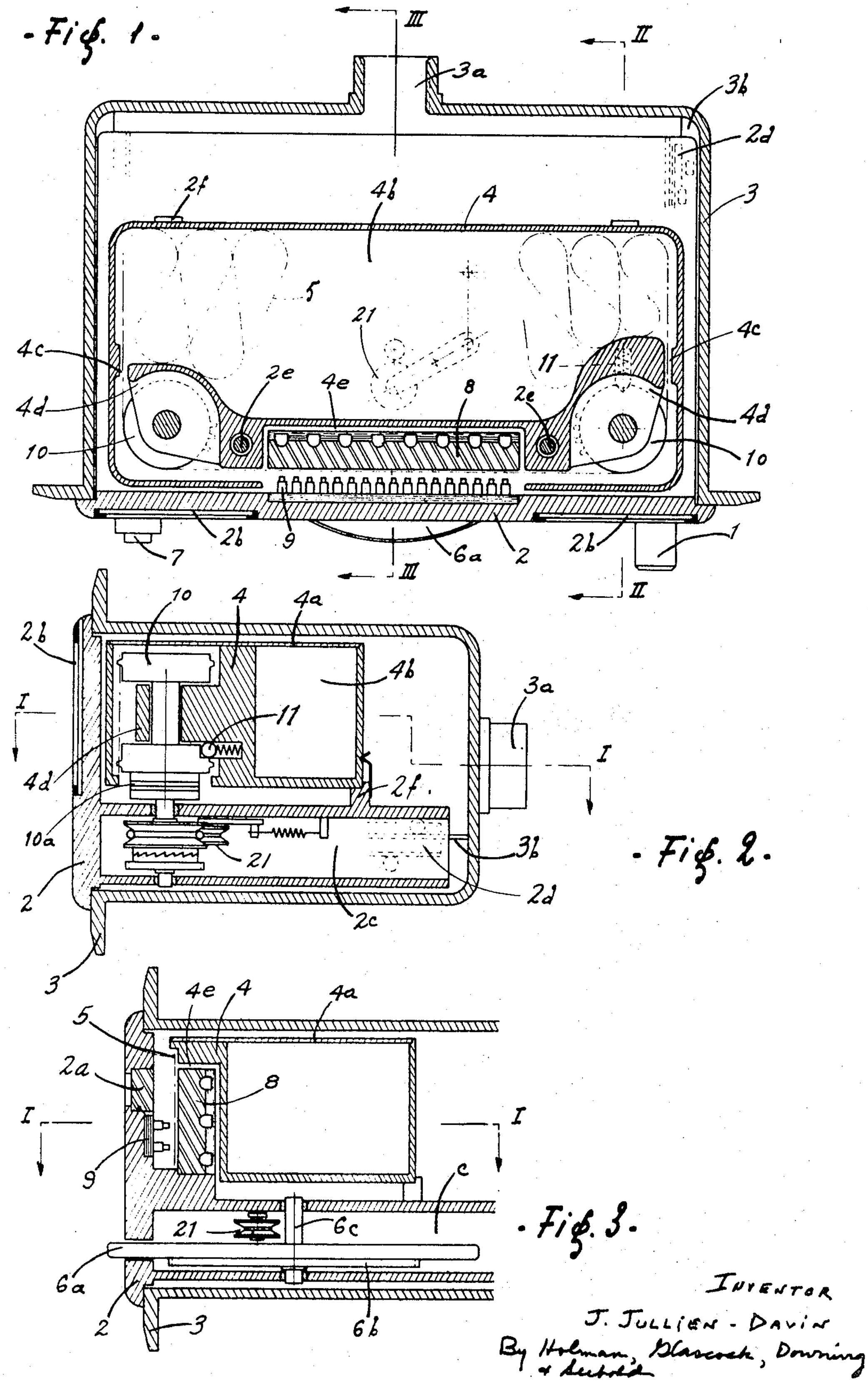
FIG. 1 is a horizontal sectional view of the apparatus taken along line I–I of FIGS. 2 and 3.
FIG. 2 is a transverse sectional view taken along line II–II of FIG. 1.
FIG. 3 is a further transverse sectional view taken along line III–III of FIG. 1.

The apparatus which is shown more particularly in FIGS. 1 to 3 and the different components of which are formed of cast light alloy comprises a casing 3 in which is engaged a sliding drawer 2 which is secured within said casing by means of a locking system (not shown in the drawings) controlled by an unlocking pushbutton 1 provided on the front face of the apparatus; the arrangement is such that, when the pushbutton 1 is depressed, the drawer 2 can be withdrawn from the casing 3 and disengaged to a sufficient extent to permit the insertion or withdrawal of a loading unit 4 containing the storage tape 5. When the loading operation is completed, the drawer 2 is pushed back and then locked automatically at the end of travel within the casing 3.

As a result of successive actions exerted on a knurled transfer disc 6*a*, the tape 5 is caused to move past a window 2*a* of the drawer 2 in ore order that the visual indication or reference of a selected station (or characteristic point) should be caused to appear in said window. A safety lamp 7 indicates the correct position of the tape in respect of the station considered; said lamp which is usually lighted is turned off only when the tape 5 is correctly positioned in respect of the station considered.

The front face of the drawer 2 is additionally provided with two windows 2*b* in which index sheets can be inserted and serve to determine the stations which are stored on the tape 5 of the magazine.

The casing 3 which is intended to be fixed on an instrument panel is provided in the rear wall with a sealed leadout bushing 3*a* for the cables and conductors and contains two rails 3*b* for guiding the drawer 2.

The drawer 2 is provided with a bottom compartment 2*c* in which is housed a transfer system described hereinafter. The illuminating unit 8 of a photoelectric reader is located at the front end of the casing and fixed on the bottom of this latter. Said illuminating unit consists of an assembly of miniature lamps which are embedded in a transparent substance (such as methyl methacrylate) and which are associated with a printed circuit.

The receiving unit 9 of said photoelectric reader is located in the front face of the drawer 2, and is composed of miniature light-sensitive cells which are also associated with a printed circuit and located opposite to the reading points (referred-to hereinafter) of the tape 5.

The sides of the drawer 2 are fitted with two guides 2*d* which are mounted on rollers. Said drawer is also provided on one side with the locking system which was mentioned earlier and which can be operated by means of the pushbutton 1.

Finally, provision is made within the drawer 2 for positioning means for a loading unit 4; said means consist of two small guide columns 2*e* fitted with circlips and also of two bosses 2*f* fitted with flexible fastening means.

The removable loading unit 4 which is closed by a cover 4*a* defines a chamber 4*b*. Two elongated slots 4*c* permit the insertion and retention of the storage tape 5 as well as the progression of this latter over a reading zone which extends over practically the entire front face of the loading unit. Said unit is provided near the front end and on both sides with two hollow bosses 4*d* in which are rotatably fitted the spindles of two studded wheels 10, said wheels being adapted to engage with the tape-transfer slots. A front clearance 4*e* which corresponds in length to the reading zone provides the necessary space for the illuminating unit 8 of the photoelectric reader.

Each studded wheel 10 is fitted at the base thereof with a friction-drive disc 10*a* and one of said wheels (namely the right-hand wheel shown in FIG. 1) is flexibly positioned by means of a spring-loaded ball 11 (as shown in particular in FIG. 2) which is adapted to cooperate with a notch formed in said wheel.

The tape 5 (as shown in FIG. 8) is closed so as to form a loop and stored in free snaked coils within the chamber 4*b* of the loading unit 4. Said tape is provided along both edges with transfer slots represented diagrammatically by two chain-dotted lines, the studs of the wheels 10 being intended to cooperate with said slots. The tape comprises translucent portions or so-called "reserves" 5*a* in which references or characteristic points of stations are recorded in clear and stored thereon. The tape is also provided on the one hand with two rows of 17 translucent points 5*b* each intended for the coded inscription of the coordinates of said stations and, on the other hand, in the case of each set of data constituted by a reserve 5*a* and two rows of translucent points 5*b*, one separate auxiliary translucent point 5*c* for indicating the correct position of the tape in order to effect the correct reading of each station. The inscription of the stations in the portions 5*a* can be effected by hand by means of Indian ink or by means of a marking pencil, the coded inscription being effected by masking a number of translucent points 5*b* (using the same means).

The tape-transfer device proper as shown in FIGS. 4 to 7 comprises an operating member 6 constituted by a knurled disc 6*a* which projects to a partial extent from the front face of the drawer 2 and by a gear 6*b*, the complete assembly being keyed on a shaft 6*c* which is rotatably mounted in the bottom compartment of the drawer 2.

The gear 6*b* is adapted to actuate an intermediate gear 12 which is in mesh with a pinion 15. By means of a ratchet-tooth-coupling system which will be described hereinafter, the pinion 15 is adapted to cooperate with a grooved pulley 13—14 or so-called variable-radius pulley. The variation in radius is obtained in known manner by means of a relative axial movement of the pulley cheeks. Said pulley 13—14 is coupled to a grooved pulley 17 by means of a belt 20 to which a tensioning roller 21 is applied, each of the two above-mentioned pulleys being coupled to the corresponding studded wheels by means of a friction-drive disc 18.

The variable-radius pulley comprises an upper cheek 13 which is rigidly fixed to the pulley shaft 13*b* and a lower cheek 14 which is slidably keyed on said shaft and integral with the driven set of teeth 14*a* of a ratchet-tooth-coupling system, the driving set of teeth 15*a* of which is integral with the pinion 15 which is rotatably mounted on the shaft 13*b*.

Three elastic friction blocks 13*a* are set in the upper cheek 13 of the pulley 13—14 and are adapted to cooperate with one of the walls of the bottom compartment of the drawer so as to apply a load torque to the shaft 13*b*. A flexible washer 16 which is interposed between the two cheeks 13 and 14 tends to separate these latter so that the belt 20 can pass over the pulley along a pitch circle having a minimum radius R*m*.

The grooved pulley 17 which is keyed on the shaft 17*a* has a radius R which is equal to the means value of the minimum and maximum radii R*m* and RM respectively of the variable-radius pulley.

Each friction-drive disc 18 comprises a metallic ring 18*a* having a rubber-covered surface 18*b*, the rings referred-to being mounted at the ends of the shafts 13*b* and 17*a* respectively as a result of the forcible insertion of a flexible annular member 19.

The operation of the magazine which has just been described is as follows:

It will first be assumed that the user has operated the knurled disc 6*a* in the direction A. By means of the intermediate gear 12 which is actuated by the gear 6*b*, the movement imparted to the disc 6*a* is transmitted to the pinion 15 which rotates in the same direction as well as to the ratchet-tooth-coupling system 15*a*—14*a* which is maintained in the engaged position under the section of the flexible washer 16, the radius of the pulley 13—14 being in that case of minimum value.

By reason of the fact that the radius R*m* of said pulley is slightly smaller than the radius R of the pulley 17, the angular velocity of the pulley last mentioned will be lower than the angular velocity of the pulley 13—14 (in this case the driving pulley), with the result that the tape 5 will remain under tension during the transfer motion and between the two studded wheels 10, said tension being limited by the slippage which is made possible between the elements 10 and 17 by virtue of the friction disc 18.

Figures 4, 5, 6:
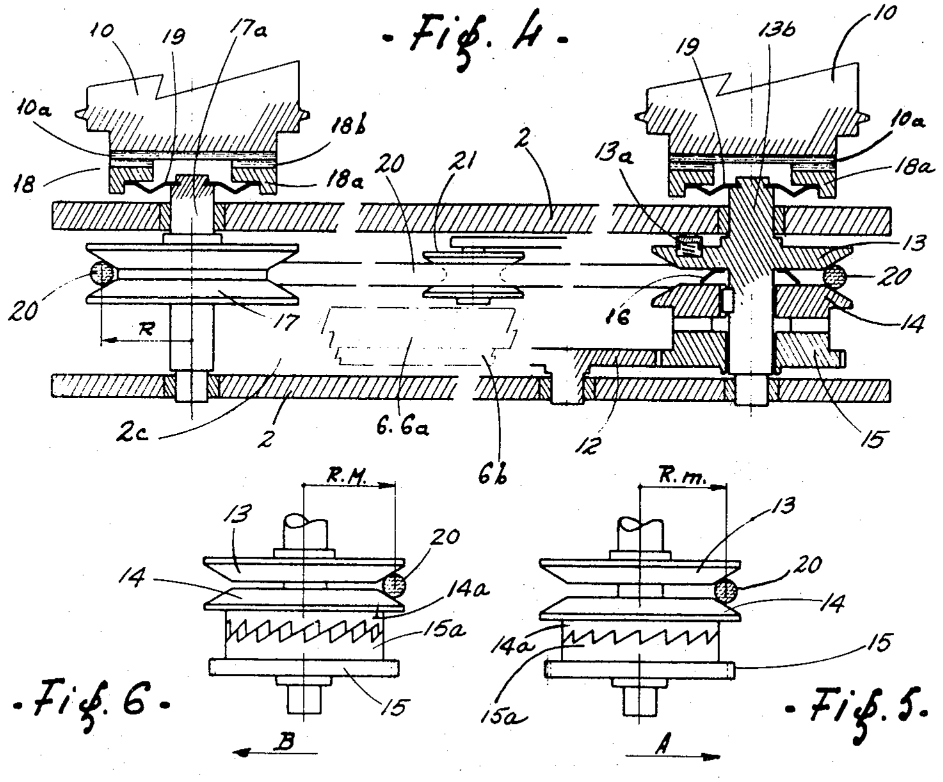
Figure 7:
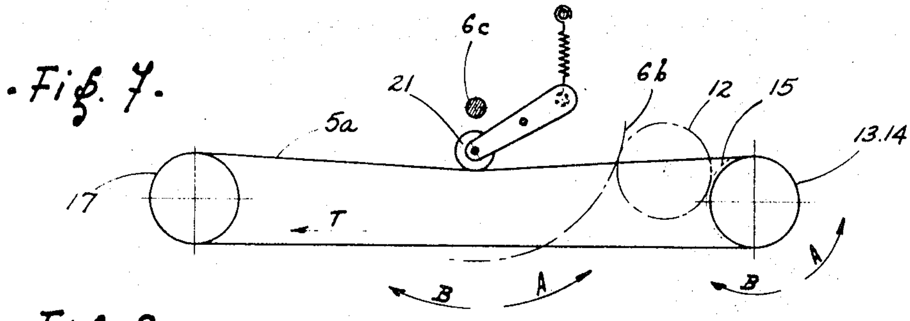

If the user operates the knurled disc 6*a* in the direction B and thus causes the pinion 15 to rotate in the same direction, the load torque which is produced by the friction blocks 13*a* causes the teeth of the ratchet-tooth-coupling asystem 15—*14a* to disengage to a partial extent (as shown in FIG. 6). Under the action of the vertical component in opposition to the elastic force exerted by the washer 16, the lower cheek 14 is lifted, with the result that the radius of the pulley 13—14 attains the maximum value RM. Inasmuch as the value RM is slightly greater than the radius R of the pulley 17, the angular velocity of the pulley last mentioned and of the corresponding studded wheel 10 will be greater than that of the studded wheel which is associated with the pulley 13—14. It accordingly follows that the tape 5 will as also under tension in this direction of transfer.

The correct positioning of the tape 5 with respect to the reading means (as indicated by the fact that the signal lamp 7 is turned off) corresponds to the flexible locking of the right-hand studded wheel as produced by the spring-loaded ball system 11.

Under the action of the tensioning roller 21, the left-hand studded wheel (namely the wheel which is associated with the pulley 17) is continuously urged in the anticlockwise direction (as shown by the arrow R in FIG. 7), with the result that the tape 5 is also tensioned from one studded wheel to the other between operations.

I claim:

1. A station-selector magazine which is suitable for use on board aircraft for storing the coordinates of a plurality of characteristic stations marking a flight path for the utilization of said coordinates in the digital computer of a navigation system, said coordinates being indicated on a recording medium which is capable of moving under the action of transfer means in front of visual observation means and photoelectric reading means and which can thus be read visually and photoelectrically, wherein said magazine comprises a casing which is intended to be fixed on a support such as the instrument panel of an aircraft, a removable drawer which is housed within said casing and capable of being locked in the utilization position and being provided at the front end with photoelectric reading means and at the bottom with positioning means for receiving a loading unit, said unit being adapted to contain on the one had the coordinate recording medium and on the other hand means for transporting said recording medium, manual-control means mounted within a bottom compartment of said drawer and serving to actuate the means for transporting the coordinate recording medium which is incorporated in said loading unit.

2. A station-selector magazine according to claim 1, wherein the coordinate recording medium contained in the loading unit consists of a flexible tape in the form of a closed loop which is placed within the loading unit so as to form free snaked coils and which is provided with transfer slots along at least one of its two edges and with translucent portions intended to receive the characteristic station references in clear, at least one row of translucent points for the coded inscription of the coordinates of said stations and one separate auxiliary translucent point for indicating the correct position of the tape with respect to the reading means.

3. A station-selector magazine according to claim 2, wherein the loading unit is provided with two slots for the insertion of the coordinate recording tape and for passing said tape in front of the reading means and wherein the transfer means incorporated in said loading unit consist of two studded wheels disposed on the front face of said loading unit on each side of a front zone of said unit from which the reading is taken, said studded wheels being adapted to cooperate with the transfer slots of the tape which is intended to move past said front zone of the loading unit, and friction-coupling means for connecting each studded wheel to the control means.

4. A station-selector magazine according to claim 3, wherein the control means comprise a manually-operated rotary element which is accessible from the exterior and a drive system for actuating the friction-coupling means of the two studded wheels, said drive system having two automatically-selected ratios each corresponding to one direction of the operation of transfer of the coordinate recording tape, the arrangement of said drive system being such that the particular studded wheel which carries out the driving function and exerts a tractive force on that portion of the tape which passes in front of the reading zone has a tendency to rotate at a higher speed than the other studded wheel so as to produce both tension and surface flatness of said portion of tape.

5. A station-selector magazine according to claim 4, wherein the drive system having two drive ratios selected as a function of the direction of operation exerted on the control element comprises a pinion which is actuated from the control element, a ratchet-tooth-coupling system having a toothed wheel which is integral with said pinion and a driven toothed wheel, a variable-diameter pulley having a driven sliding cheek which is integral with said driven tooth wheel and a nonsliding cheek which is separated from said sliding cheek by an elastic ring which tends on the one hand to separate the two cheeks in order that said pulley should have a minimum diameter and on the other hand to cause the full engagement of the two toothed rings of the ratchet-tooth-coupling system, a pulley having a fixed diameter comprised between the maximum and minimum values of the variable-diameter pulley and coupled with said variable-diameter pulley means of a belt, the two pulleys being connected to the respective friction-coupling systems of the two studded wheels and the directions of the teeth of the ratchet-tooth-coupling system being such that the two meshed toothed wheels are in contact on the root circle and that the diameter of the corresponding pulley is of minimum value when the studded wheel which is associated therewith is the driving pulley.

6. A station-selector magazine according to claim 4, wherein the connection between each friction-coupling system and the shaft of the corresponding pulley is obtained by means of a flexible engagement device.

7. A station-selector magazine according to claim 4, wherein the loading unit is provided with a recess in the zone corresponding to the reading zone whilst the drawer is provided on the one hand with an illuminating unit adapted to engage in said recess which is closed off by the coordinate recording tape and on the other hand with a photoelectric reading unit placed opposite to the illuminating unit and separated therefrom by said tape, the front wall of the drawer being additionally provided with a window for reading indications in clear which are carried by the translucent portions of the tape.